United States Patent Office 3,088,762
Patented May 7, 1963

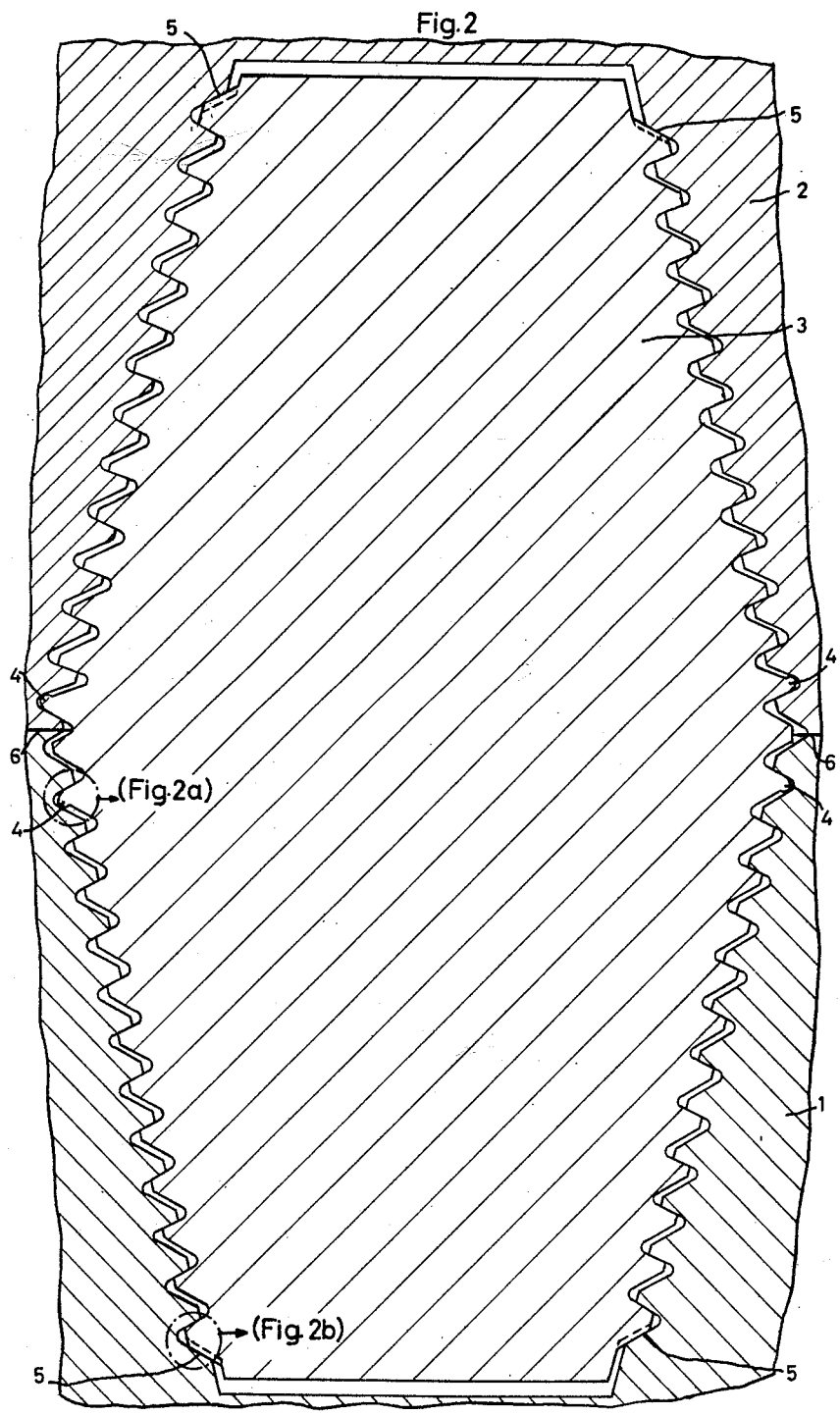

3,088,762
SCREW NIPPLE JOINT FOR CARBON ELECTRODES
Waldemar Kaufmann and Wilfried Hub, Meitingen, near Augsburg, Germany, assignors to Siemens-Planiawerke Aktiengesellschaft für Kohlefabrikate, Meitingen, near Augsburg, Germany, a corporation of Germany
Filed Jan. 25, 1961, Ser. No. 84,804
Claims priority, application Germany Jan. 27, 1960
5 Claims. (Cl. 287—127)

Our invention relates to a butt joint between graphite or other carbon electrodes for electric furnaces and for other electric purposes, and particularly to electrode joints that comprise a double-conical threaded nipple plug of electrode material whose two tapering portions are in threaded engagement with respective conical socket recesses in the butt faces of the coaxially aligned electrodes. Such butt joints serve to join a new electrode with the end of a nearly consumed electrode to permit continuous electric operation by replenishing the electrode material substantially in accordance with the rate of consumption.

In a more particular aspect, the invention concerns electrode butt joints of the type disclosed in U.S. Patent 2,957,716 and in the copending application Serial No. 851,398, filed November 6, 1959, both assigned to the assignee of the present invention. According to these prior disclosures, the junction nipple can be fixed between the two carbon electrodes by means of abutment or spacer structures in such a manner that only the thread flanks facing the butt junction are in touch with the flanks of the internal threads in the electrode sockets.

Spacer structures of the just-mentioned type determine a fixed point for the junction nipple only at one location, or only within a narrow range, relative to the inner threads of the electrode sockets. Consequently, even when the nipples are fully tightened up to the limit position relative to the two electrodes, the nipple axis can become edged in some cases relative to the electrode axis, whereby a faulty electrode alignment and consequent operating trouble may result.

It is an object of our present invention to improve nipple junctions of the above-mentioned kind by reliably eliminating such possibility of edging.

To this end, and in accordance with a feature of our invention, we provide stop or abutment means in the vicinity of the tip as well as in the vicinity of the base of at least one of the two conical portions of the nipple. As a result, this nipple cone is reliably held in a fixed position at two axially spaced locations in the inner thread of the electrode socket so that the nipple axis cannot become edged relative to the axis of the electrode.

According to another and preferred feature of our invention, the above-mentioned two axially spaced stop and abutment means are formed by thickening the crests of the screw thread by giving it a bulged shape along at least one turn of the nipple thread. Either the crest of the socket inner thread or the crest of the nipple threads can be thickened in this manner, the latter feature being preferably employed.

According to another feature of our invention, the above-mentioned two axially spaced stop abutments are formed by giving at least one turn of the thread an abnormal height or width, i.e. a longer profile dimension than the other, normal threads. Either the socket thread or the nipple thread may thus be designed, the latter feature being preferably employed.

The invention will be further described with reference to the embodiments of threaded nipple junctions according to the invention illustrated by way of example on the accompanying drawings in which:

FIG. 2 is an axial section through a nipple junction according to the invention.

Figure 1:
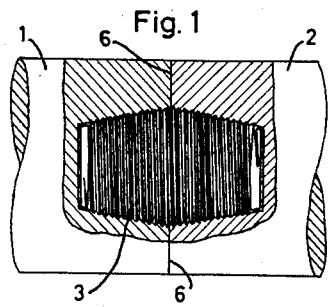
FIG. 1 shows partly in section a complete nipple junction for explanatory purposes only.

According to FIG. 1, two carbon electrodes 1 and 2 are joined with each other by a double-conical screw nipple 3 of electrode material which engages respective threaded frusto-conical and inwardly tapering sockets of the electrodes and permits tightening the two electrodes together in face-to-face contact at the butt junction 6.

Figure 2A:
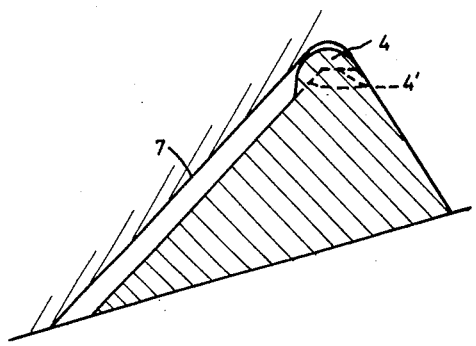
FIGS. 2a, 2b illustrate portions of FIG. 2 on enlarged scale.
Figure 2B:
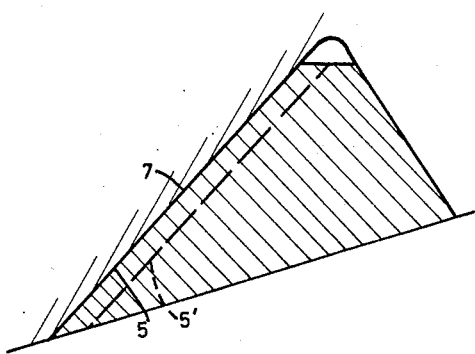

According to the invention, the threaded engagement between the nipple plug and the electrode sockets is designed as exemplified in the embodiment illustrated in FIGS. 2, 2a and 2b and described presently.

As in FIG. 1, the two electrodes 1 and 2 shown in FIG. 2 are joined together by a nipple plug 3 of double conical design which forces the butt faces of the two electrodes together at 6.

One of the turns of the nipple thread, namely a turn close to the butt junction 6 is provided with a bulge that extends around the crest of the turn and thus thickens this thread in order to form a stop or abutment. This particular turn of thread is denoted in FIG. 2 by "FIG. 2a" and is separately illustrated in FIG. 2a. The bulge-like thickening is denoted in FIG. 2a by 4. The broken lines 4' indicate the normal shape of the thread profile. Denoted by 7 in FIG. 2a is the adjacent flank of the socket thread in electrode 1. As is apparent, the bulge 4 is so dimensioned that it lies against the flank 7 of the inner thread in the electrode socket when the nipple is in the illustrated screwed-in and active position. As also shown in FIG. 2, one other turn of the nipple thread is thickened at its crest. This turn is denoted in FIG. 2 by "FIG. 2b" and is separately illustrated in FIG. 2b. This second turn is located close to the narrow end of the nipple plug 3.

While the thickening of the latter turn may be designed in the same manner as shown in FIG. 2a, a modification is illustrated in FIG. 2b. According to FIG. 2b the flank 5 of the nipple thread is given greater axial height than the other threads, the broken line 5' indicating the location of the normal flank. The difference between the normal flank 5' and the flank 5 denotes the effective thickening of this turn of thread, which constitutes a stop or abutment in the sense of the invention. The chosen thickening is such that the turn 2b rests tightly against the flank 7 of the inner socket thread in electrode 1.

It is essential that the thickened portion of the two turns, adjacent to the butt gap and adjacent to the nipple end respectively, are located on those flanks that face away from the butt faces 6 of the electrodes.

Due to the fact that the respective abutments formed at the crests or along one flank of the two turns according to FIG. 2a and FIG. 2b are axially spaced from each other along the nipple so as to be located near the butt junction and near the nipple end respectively, any edging of the nipple axis relative to the common axis of the two electrodes to be joined is prevented, regardless of any degree of tightening pressure that may be applied between the threads of the nipple on the one hand and of the sockets on the other hand.

Figure 3:
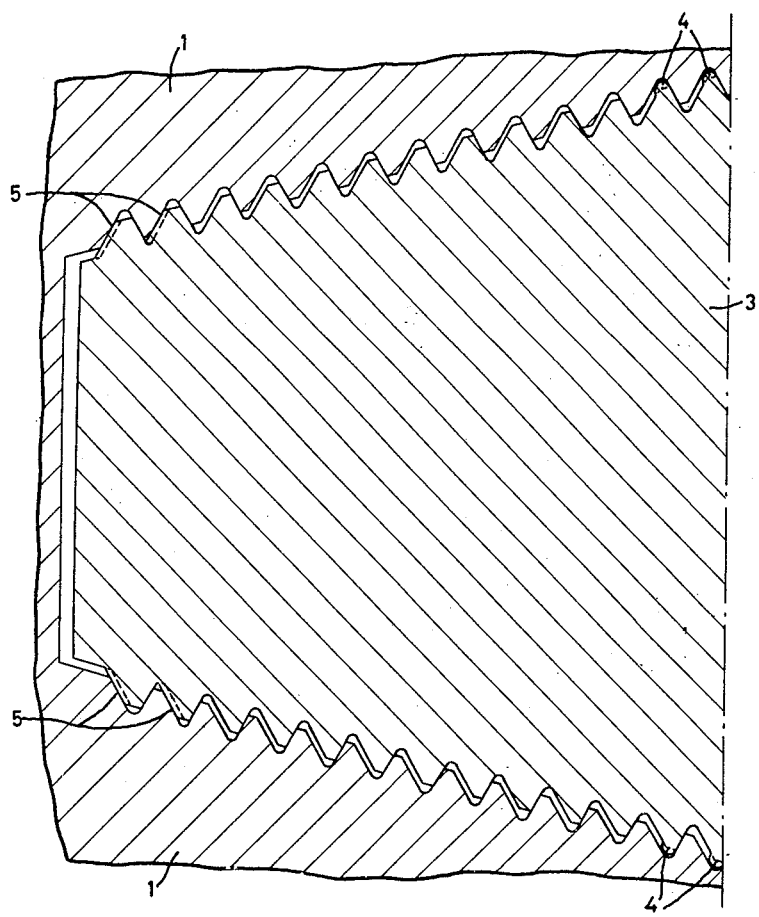
FIG. 3 shows a portion of another nipple junction according to the invention in section.

While according to FIGS. 2, 2a, 2b only one turn of thread in each conical half-portion of the nipple is provided with a thickening bulge and only one other turn is thickened by increasing its axial height, the embodiment illustrated in FIG. 3 differs therefrom in that two turns in each cone portion of the nipple have flanks 5 of increased height, and two mutually adjacent turns are provided with thickening bulges 4. The two turns with bulges 4 at the crest are close to the center plane of the nipple. The two turns 5 of increased axial height are adjacent to the nipple end.

Figure 4:
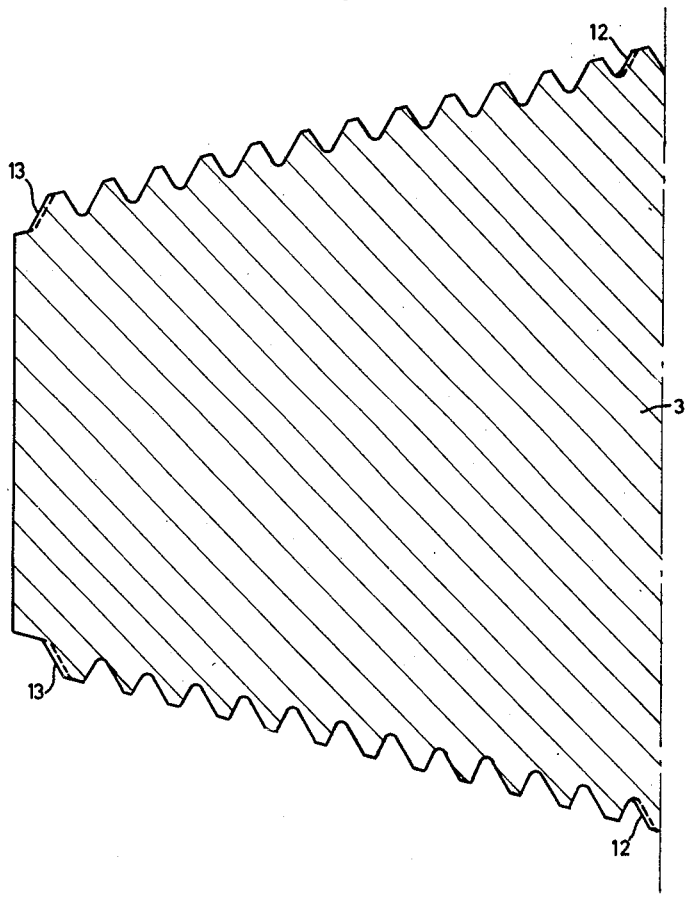
FIGS. 4 and 5 illustrate further embodiments respectively.

FIG. 4 shows one conical half portion of a nipple in which one turn of thread has a widened flank portion 12 located near the nipple end, and has a single other turn 13 near the nipple center plane likewise provided with an increased flank width.

Figure 5:
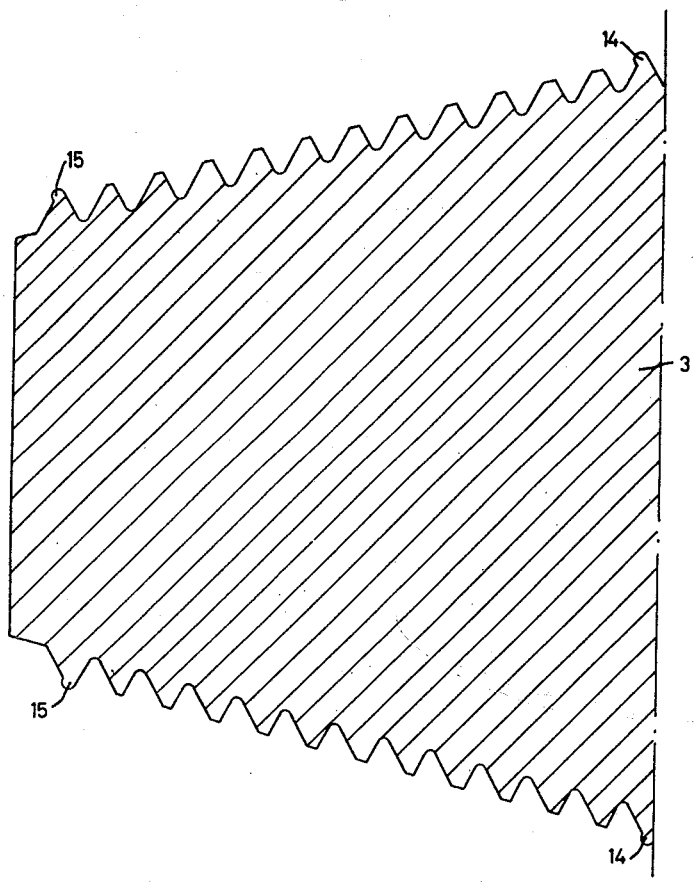

In the modification of a nipple shown in FIG. 5, one turn of nipple thread, denoted by 14, has a thickening bulge and a single other turn of thread 15 near the nipple center plane has likewise a thickening bulge, these bulges corresponding to the one separately shown in FIG. 2a.

A nipple junction according to the invention as embodied in the devices described above, provides simple and easily applicable means which not only secure a symmetric position of the nipple while the screw joint is being made in cold condition, but which also minimize any misalignment due to thermal expansion of the connecting nipple during heating of the junction.

In many cases it suffices if only one, namely the first screwed-in portion of the double-conical nipple, or only the one corresponding electrode socket, is provided with the above-described abutment means for symmetrically positioning the nipple and preventing the danger of edging. However, such abutment means may also be located on both conical sides of the nipple or in both electrode sockets. This has the advantage that no attention need be given to selecting the correct nipple half or the correct electrode socket when assembling the first screwed-in junction. This also affords the possibility of reliably securing a sufficient clearance between the majority of the flanks on the nipple and socket threads that are not provided with the above-mentioned abutment or stop structures. If both nipple cones or both sockets are provided with such abutment means, the proper clearance in the preponderant portion of the threaded junction, desirable for prevention of breakage due to thermal expansion, is always reliably established when the butt faces are fully tightened against each other.

As mentioned, it is preferable to provide the nipple rather than the electrode sockets with abutment structures of the type illustrated in FIGS. 2a and 2b. This has the advantage that only the nipple need be changed relative to those heretofore employed for such purposes. Such nipples according to the invention will then secure the above-mentioned advantages when used with any existing electrodes with normal socket threads.

We claim:
1. A carbon electrode joint, comprising two carbon electrodes coaxially aligned in abutment with each other and forming each a frusto-conical, inwardly tapering and threaded socket in its butt face, a double-conical screw nipple of electrode material having respective external threads on each half portion thereof for engaging the threads of said respective two sockets, a first abutment means extending near said butt face along a portion of at least one thread turn of at least one conical nipple portion, second abutment means extending along a portion of at least one turn of said same nipple portion but near the nipple end, said two abutment means being located at a nipple-thread flank facing away from the butt face for providing space for thermal expansion whereas the other nipple-thread flank directly engages the adjacent socket-thread flank.

2. In a carbon-electrode joint according to claim 1, said first abutment means consisting of a thickening bulge extending along the crest of said thread turn portion and forming an integral part thereof.

3. In a carbon-electrode joint according to claim 1, said abutment means consisting of an axially thickened portion of said thread turn portion so as to be integral therewith.

4. In a carbon-electrode joint according to claim 1, each of said abutment means being located along not less than one and not more than two full turns, and the sum of the number of turns along which said abutment means are located being smaller than the total number of nipple turns in said one conical nipple portion, a clearance remaining between the majority of mutually engaged nipple and socket turns located axially between said two abutment means.

5. A nipple screw plug for carbon-electrode joints, comprising a double-conical body of electrode material having two threaded portions tapering from the middle toward the plug end, at least one of said two portions having two abutment means integral with the nipple threads and consisting of thread turns thicker, at least in part, than the majority of the turns, said two abutment means being located respectively near the nipple middle and near the nipple end and extending each at least along one turn, said majority of turns being located axially between said two abutment means.

References Cited in the file of this patent

UNITED STATES PATENTS

| 2,301,181 | Ilsemann | Nov. 10, 1942 |
| 2,744,945 | Johnson | May 8, 1956 |

FOREIGN PATENTS

| 573,602 | Great Britain | Nov. 28, 1945 |